Figure 3:
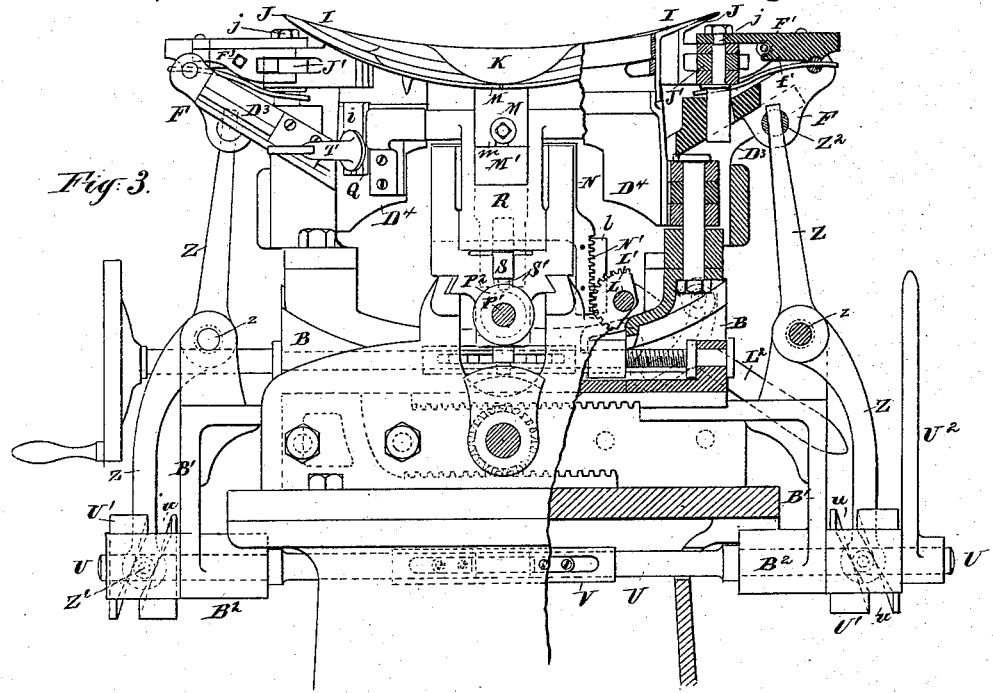

(No Model.) 5 Sheets—Sheet 1.
L. H. HOYT.
MACHINE FOR SHAPING HAT BRIMS.
No. 388,492. Patented Aug. 28, 1888.
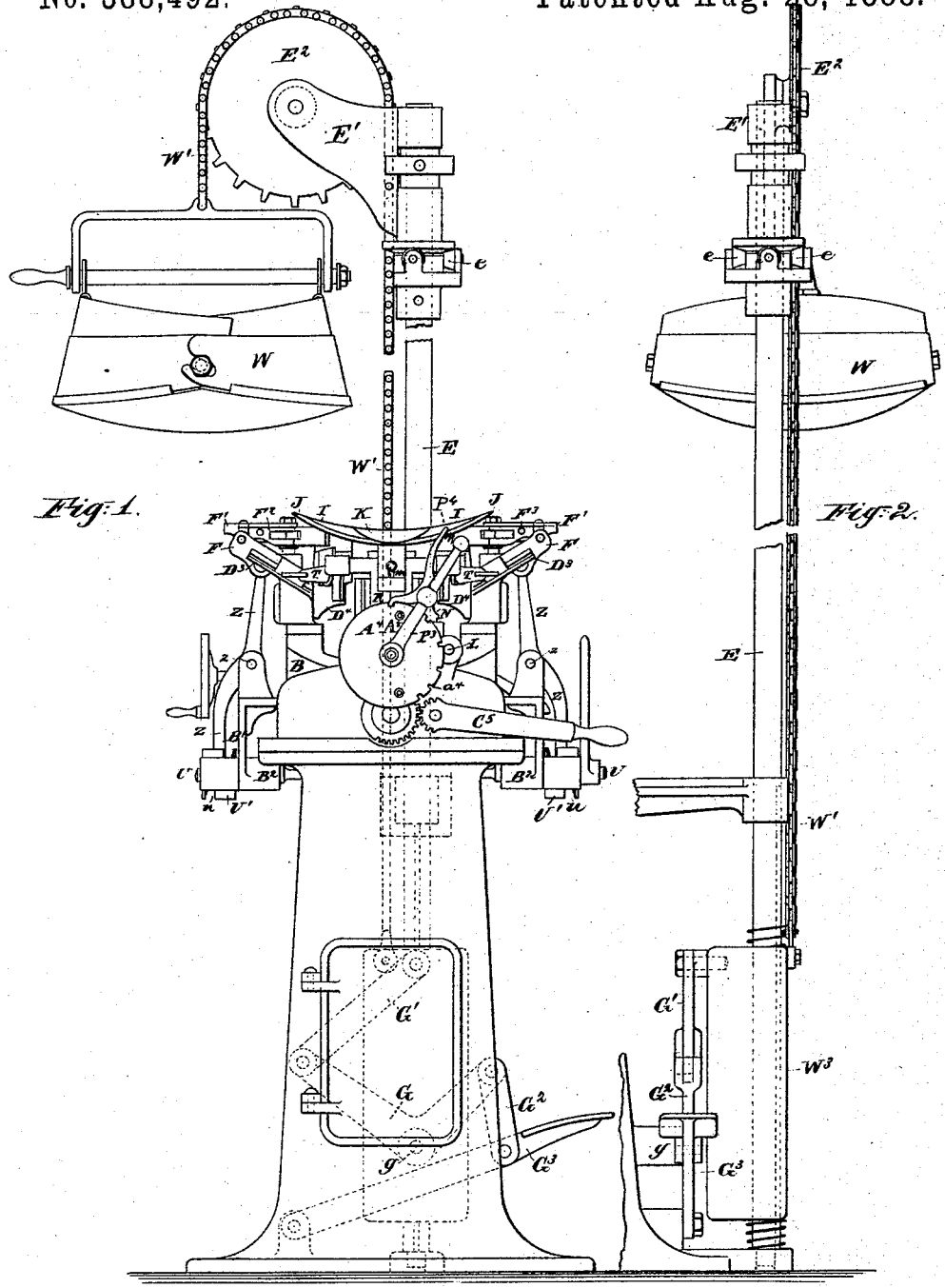

(No Model.) 5 Sheets—Sheet 2.

L. H. HOYT.
MACHINE FOR SHAPING HAT BRIMS.

No. 388,492. Patented Aug. 28, 1888.

Witnesses:
Charles R. Searle.
H. A. Johnstone.

Inventor:
Lucius H. Hoyt,
by his attorney
Thomas Drew Stetson.

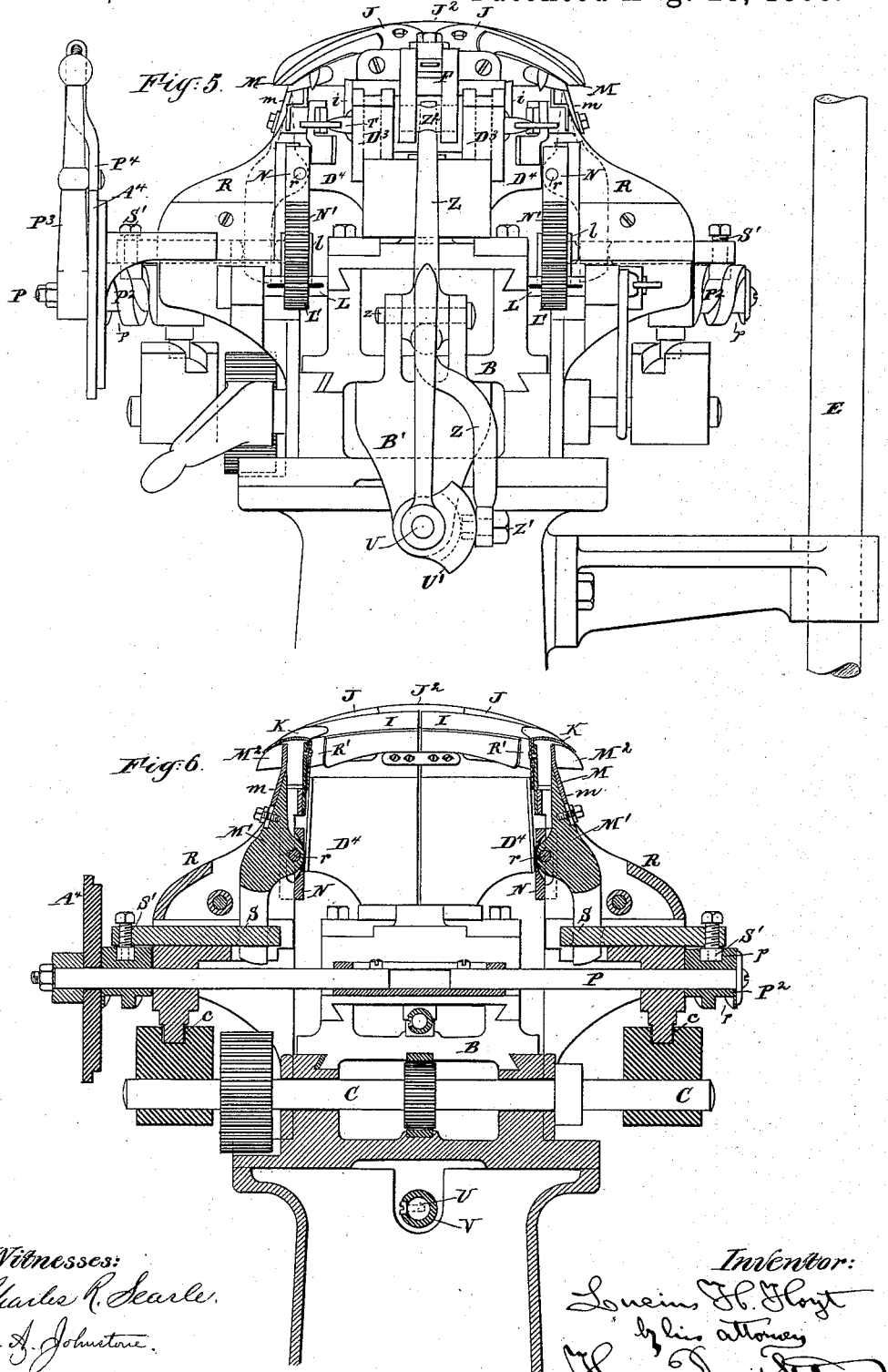

(No Model.) 5 Sheets—Sheet 4.
L. H. HOYT.
MACHINE FOR SHAPING HAT BRIMS.
No. 388,492. Patented Aug. 28, 1888.
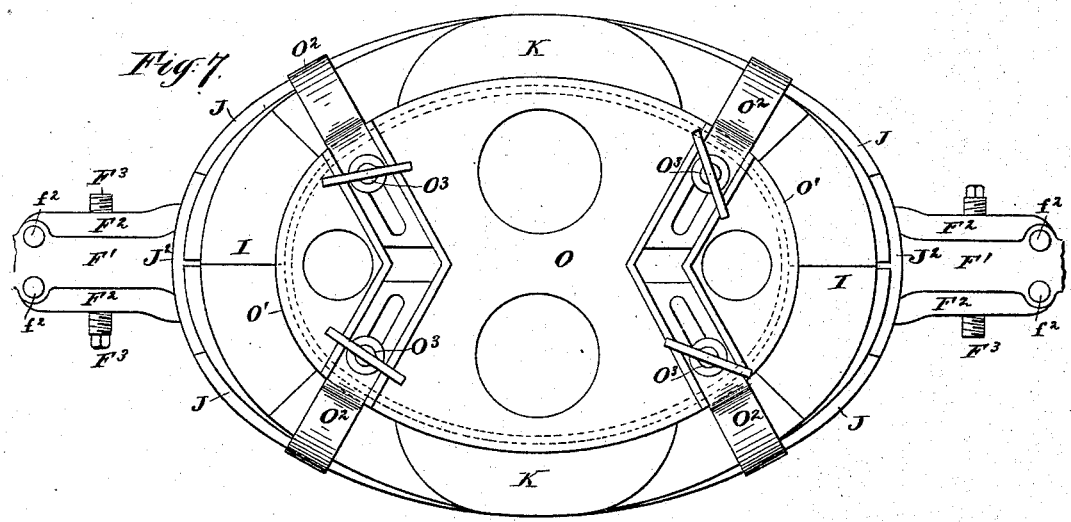
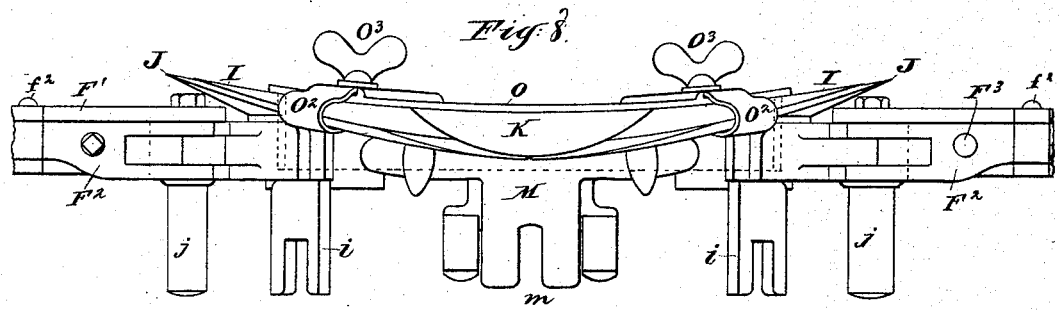
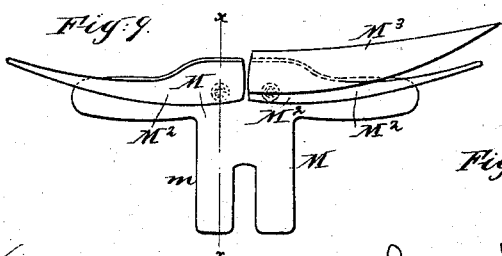 
Witnesses:
Charles R. Searle,
H. A. Johnstone.
Inventor:
Lucius H. Hoyt,
by his attorney
Thomas Drew Stetson.

(No Model.) 5 Sheets—Sheet 5.
L. H. HOYT.
MACHINE FOR SHAPING HAT BRIMS.
No. 388,492. Patented Aug. 28, 1888.
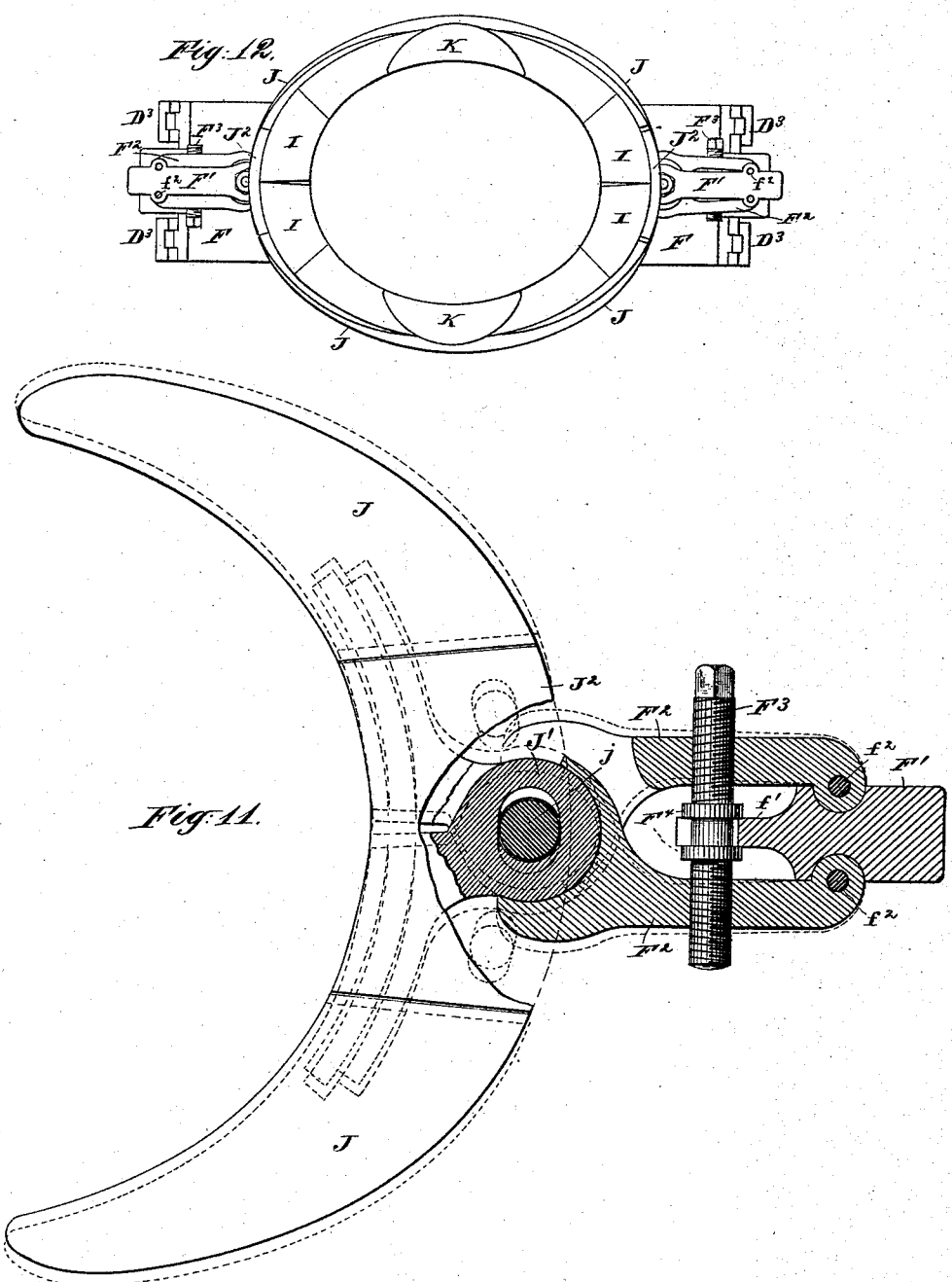
Witnesses:
Charles R. Searle,
H. A. Johnstone.
Inventor:
Lucius H. Hoyt,
by his attorney
Thomas Drew Stetson.
N. PETERS, Photo-Lithographer, Washington, D. C.

UNITED STATES PATENT OFFICE.

LUCIUS H. HOYT, OF DANBURY, CONNECTICUT.

MACHINE FOR SHAPING HAT-BRIMS.

SPECIFICATION forming part of Letters Patent No. 388,492, dated August 28, 1888.

Application filed February 28, 1888. Serial No. 265,604. (No model.)

*To all whom it may concern:*

Be it known that I, LUCIUS H. HOYT, of Danbury, in the county of Fairfield and State of Connecticut, have invented a certain new and useful Improvement in Machines for Shaping Hat-Brims, of which the following is a specification.

I have in Letters Patent issued to me, dated March 23, 1886, No. 338,272, described mechanism whereby variations in the size and form of a brim may be attained by certain adjustments of the overlapping pieces which shape the lower surface when the hat is in the ordinary inverted position. I have devised further improvements in the mechanism which I will now describe. The metallic parts presented to the hat-brim are thin and lie lapping one upon another after the manner of the feathers of a bird or the scales of a fish. Each is chamfered or especially thin near its edge, so as to present no appreciable mark on the hat-brim when the latter is shaped by pressure thereon. It will be understood that the hat-brim has been previously curled and that before its treatment in this machine it is softened by heat, so as to be easily bent and curved as required. The parts of the machine which are presented to the hat when treating stiff hats are cold, or nearly so. The sand-bag or other yielding surface which is applied above to press the hat-brim upon the shaping surfaces is also cold. It is found by trial that holding the softened material in the exactly correct position for a brief period between cold surfaces suffices to set the brim permanently.

One portion of my present invention consists in providing exchangeable heads carrying each a different set of shaping parts to match on a single set of adjusting mechanism. It is found by practice that there is a limit to the extent of adjustment of the overlapping parts. I make one foundation-casting and one set of levers, shafts, cams, and other adjusting mechanism serve for all sizes and styles of hats by providing two or more exchangeable heads to match thereon. These "heads" include the thin overlapping parts which shape the brim and a sufficient depth of foundation or supporting parts therefor to connect them flexibly together and to allow of their being applied upon and removed from the other parts of the machine. The heads differ one from another, one being adapted for all the adjustments required for the widest brims, and another for narrower brims, and so on. I propose usually to furnish three removable heads with each machine.

I have devised improved means for varying at pleasure what is termed the "droop" of the hat at the front and back, thereby insuring an equal droop at each end without attention. I have devised improved means for adjusting the form of what is sometimes termed the "roll"—the portions of the brim which extend outward and upward at the sides. I provide in connection therewith for applying force to move the shaping parts which match into the curl or inward bend of the outer edge of the roll at each side, so that so soon as the hat is placed in position and the curl fitted upon the proper shaping-pieces those pieces are moved forcibly apart and then drawn downward, or are moved outward or downward alone, at will of the operator, so as to smoothly extend the brim at those points and produce the desired form of the curl with ease and certainty. I provide means for preventing the parts from being worked too far, so as to strain or break the machine in any emergency, and I provide for connecting the mechanism which shapes the front and the rear edges, so that both are worked simultaneously by a single movement.

I employ a sand-pan having a metallic frame and a flexible bottom adapted to contain a quantity of sand and apply pressure yieldingly to the properly-supported brim held on the brim-shaping parts. I counterbalance the sand-pan by a weight which is of greater mass. Instead of lifting the sand pan by the foot, I employ a bell-crank lever and link arranged to act togglewise to raise the weight. The gravity of the weight raises the sand-pan when released. I depress the sand-pan by raising the weight. The arrangement of the lever and link allows the foot to easily hold the weight elevated and allow the whole or nearly the whole gravity of the sand-pan to be usefully applied upon the brim.

The accompanying drawings form a part of this specification, and represent what I consider the best means of carrying out the invention.

Figure 4:
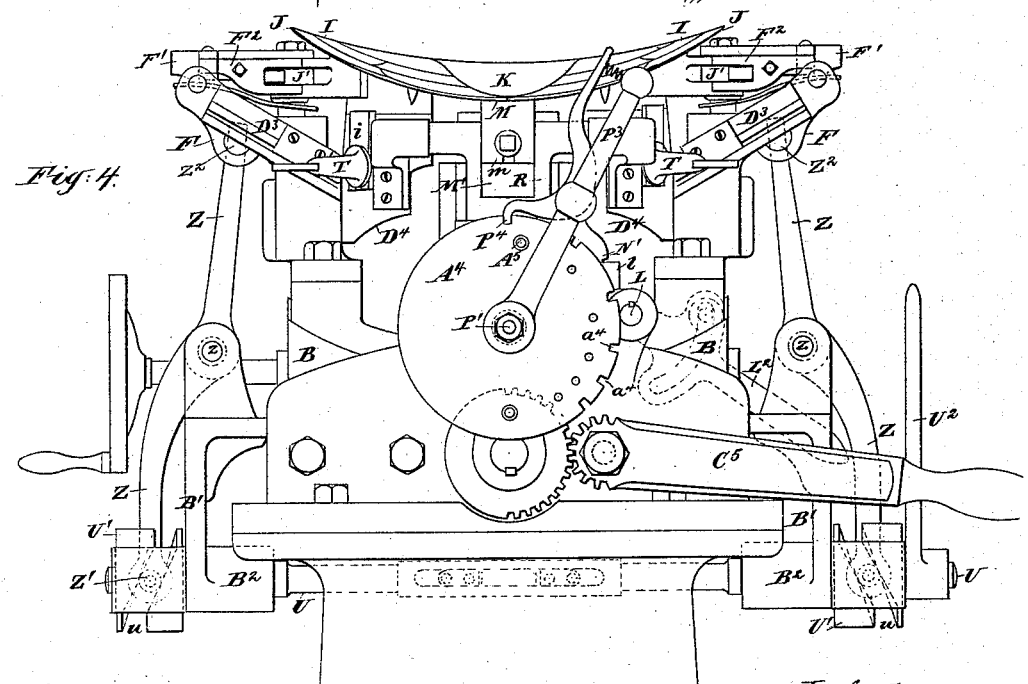

Figure 1 is an elevation showing the entire machine. Fig. 2 is an elevation of a portion at right angles thereto. In these views the sand-pan is elevated and turned out of use. The remaining figures show certain portions on a larger scale. Fig. 3 is a side elevation, partly in section, with certain portions removed and a part broken away to show the construction of the interior. Fig. 4 is a complete side elevation. Fig. 5 is an end elevation. Fig. 6 is a central cross-section. Fig. 7 is a plan view of the detachable head with the filling-piece and clamping-hooks for holding its parts properly in place relatively to each other while it is disconnected from the machine. Fig. 8 is a corresponding side elevation. Fig. 9 is an elevation showing a portion of the head detached. Fig. 10 is a vertical section on the line $x\ x$ in Fig. 9. Fig. 11 is a plan view of a portion partly in horizontal section. Fig. 12 is a plan view of the head complete without its filling-piece and clamping-hooks. It is on the same scale as Figs. 3, 4, 5, and 6.

Similar letters of reference indicate corresponding parts in all the figures where they occur.

The general construction and mode of operation of the machine resemble that of the machine set forth in the said patent of 1886. It will be understood that parts not specifically described in either patent may be of any ordinary or suitable construction. The said patent of 1886 describes thin metallic parts I J K, overlapping one upon another in a manner analogous to fish-scales or bird-feathers in the required positions to form an oval ring lying approximately horizontal, and capable of being changed in form and dimension to mold and shape the brim. I do the same in my present invention. The removable portion constituting the exchangeable head comprises these parts which lap upon each other, and also provisions to enable them to be conveniently mounted and supported upon the several portions of the machine below, by which machine their positions are adjusted. The changes of position of the parts required to introduce and remove a hat and to properly shape the brim are made by moving the proper levers as each hat is treated.

When the machine is worked continuously on a given size or style of hat, or on sizes and breadths of brims within the range of expansion, the same head is kept in use and the other heads remain idle in some conveniently accessible position; but when it is desired to greatly change the size and breadth of brim, so that the parts of this head are illy adapted for the new conditions, the difficulty is overcome by lifting off the head, including all the parts I J K, and putting it entirely out of use, while another head or set of adjustable parts better adapted to the new style or size or breadth of rim is brought from its resting-place and put in position for use in the machine.

Pinching-screws T are set in the adjustable parts $D^4$, adapted to receive forked roots or tenons $i$, provided on the bases of the parts I, which parts, with others to be described, constitute a removable head. The exchange of the heads is effected by slackening the pinching-screws T, lifting off the head, and carrying it to a convenient storage-place, (taking care, by means shown farther on, to not materially derange the relations of its parts.) When after any lapse of time it is desired to restore this head again to use, the one used in the interim is similarly removed, and this head is brought and placed in position, setting the forked roots $i$ astride of the screws T, and introducing a firm hold thereon by tightening the said screws.

In the patent of 1886 the parts J, which shape the exteriors of the brims at the front and rear, are adjusted outward and inward by screws which are operated independently. It requires attention to change them to an equal extent. In the present machine these adjustments are connected.

U U are two shafts in line with each other, extending longitudinally of the machine, and connected by a sleeve, V, mounted at the mid-length position and engaging therewith by feathers. Each shaft U is compelled to move outward and inward with its respective carriage B by means of a rigid arm, B', extending downward from the carriage and taking hold of the shaft, as shown. On the overhung end of each shaft U is an enlargement or boss, U', provided with an oblique groove, $u$, analogous to a screw-thread. These grooves are inclined in opposite directions, so as to form parts of a right and left screw-thread.

Z Z are levers mounted each on a pivot, $z$, on its proper carriage B, and having each a pin, Z', which engages in a groove, $u$. The upper end of this lever Z takes hold of a slide, F, supported on inclined ways $D^3$ near the upper portion of the machine.

The shafts U U are each efficiently supported by the single long bearing $B^2$ in the arm B', and as the carriages are moved apart and together by turning the lever $C^5$ the whole of each set of mechanism at the front and back and sides of the machine, respectively, moves bodily apart or together. This operation causes no motion of each set among themselves. To change the breadth of brim at the front and back, it is only necessary to turn the lever $U^2$, and thereby turn the shafts U U. This movement will, by the action of the inclines or screw-threaded grooves in the enlargements U' U', turn the levers Z Z each exactly to the same extent as its mate, and thus the adjustments of the position of the parts J at each end are effected simultaneously and equally. The slides or carriages F, which are thus moved equally outward and inward on the inclined slides $D^3$, carry each a stout upright pin, $j$, which serves as the pivot for the knuckle-joint which supports the two halves of the corresponding shaping-pieces, J. The pivots allow the halves to turn a little, and thus to better accommodate themselves to the changes of shape required. The upper end of each lever Z describes an arc around the pivot $z$ as a center, while the slide F, which it actuates, moves in a right line at the desired inclination. The difference in the direction of the motion is accommodated by allowing the lever Z to slide endwise through a slightly-rocking block, $Z^2$, carried on the slide, as shown in Fig. 3.

I provide for varying the form of the brim at what are termed the "quarters"—points intermediate between the front and the sides—by changing the exterior contour of the pieces J, which shape the exterior of the brim at the front and rear. To do this I provide for shifting the centers $j$ on which the two halves of each part J are pivoted.

Referring to Fig. 11, it will be seen that the knuckle-joint which embraces the pivot of the two parts of J is not centered strictly on the post or pin $j$, but is slotted to allow a lateral movement on such pin, and is accurately finished on the exterior, so that its outer surface affords a true cylindrical bearing held within close-fitting cheeks $F^2$, which are pivoted on the top piece, F', carried on the carriage F, and are controlled in position by a right and left screw, $F^3$, which is, by means of collars $F^4$ engaging with a bar, $f'$, held centrally in top piece, F'. This holds the screw $F^3$ firmly against end movement, but allows it to be revolved by a suitable wrench or key applied on the squared end. The cheeks $F^2$ will embrace their respective parts of the knuckle J', and may, by turning the screw $F^3$ in one direction, be brought together, so that the centers of their respective parts of the knuckle will coincide. Both parts of the plate J thus conditioned turn on a single axis, which is coincident with the center of the pivot $j$; but by turning the right and left screw $F^3$ in the direction to move the cheeks $F^2$ apart, each of the cheeks $F^2$ turning on its pivot $f^2$ and being stiffly held in the proper position by the right and left screw $F^3$, the centers or axes of the two halves of the knuckle J' are brought out of coincidence, the part belonging to the right-hand side of the plate J being moved to the right and the part belonging to the left-hand portion of the plate J being moved to the left. This motion may in practice be carried up to a quarter of an inch or more—that is to say, the centers of the two halves of the knuckle may be a quarter-inch out of coincidence. Such an adjustment would square the front and rear of the hat-brim to that extent; but it is rarely necessary to carry it to such extreme to give the required form to the outline of the hat-brim. A change of one-sixteenth of an inch in this respect makes a change in the form of the hat-brim, which is appreciated as important in the trade. This mechanism gives complete control of this widening and narrowing at the quarters alone.

A thin plate, $J^2$, covers the joint between the two parts of the plate J. The function of this covering-plate $J^2$ is not important when the knuckle J' is closed together or both parts caused to turn on a single axis; but when by turning the screw $F^3$ the axes are moved out of coincidence and a considerable joint is opened between the two parts of the plate J this covering-plate $J^2$ is important in bridging across the gap and making a smooth surface to support the brim uniformly.

In my patent of 1886 the parts M, which mold the outer portions of the roll at each side of the hat, are provided each with a forked root, $m$, and carried each on a lever, M', turning on a pivot, $r$, supported in the corresponding side piece, R. These levers M' are controlled by slides S, actuated by pins S', engaging in right and left screw-threads or inclined grooves $p$ in enlargements $P^2$, fixed on shafts P, and controlled by a lever, $P^3$, equipped with a dog, $P^4$, engaging in notches $a^4$ in a fixed wheel or arc, $A^4$. In my present invention the same general form and mode of operation is involved and the parts are similarly lettered; but I have added provisions for stretching the roll downward, so as to smooth it perfectly after it is extended to the proper extent.

N N are vertically-moving slides supported on dovetailed guides, which form portions of the side carriages, R, which are moved outward and inward by the rocking of the shaft C, acting through the right and left inclined grooves $c$. Each of the vertical slides N is provided with a rack, N', which is engaged by a spur gear-wheel, L', fixed on the shaft L.

The upper portion of each side piece, M, is formed of two branches, $M^2$, which extend forward and backward from the main piece M. Each is provided with an elastic cover, $M^3$, of thin metal, and pivoted to M by being confined by screws $m^2$, set tightly in the piece M, and form by their heads and shanks easy-fitting pivots, on which the parts $M^2$ turn slightly, the form of the parts being such as to soon meet and prevent them turning too far. It follows from this arrangement that each part $M^2$ yields to the strains imposed and contributes to give an easy and graceful curve to the side of the hat-brim, yielding not only by the elasticity of its thin covering-piece $M^3$, but also by its capacity for turning on the pivot $m^2$.

The racks N' have each a width a little greater than that of the pinion L', with which they engage. On the outer and inner face of each rack is riveted or otherwise firmly secured a thin plate, $l$, which projects forward a little beyond the points of the teeth. The pinion turns easily in the space between these plates, and is kept in line with the racks by the plates. The pinions L' are feathered on the shaft L, which latter is splined its whole length. The plates $l$ at the sides of the racks N' compel the pinions to traverse axially outward and inward on the shaft L, as required, keeping each always properly engaged with its rack N'.

When by the means before described the machine has, by turning the lever $C^5$, been sufficiently opened to relax the grip on the crown of the hat, the attendant also raises the dog P⁴ and shifts the lever P³, so as to move inward the parts M. This liberates the curl of the hat and allows it to be easily lifted out. When another hat, with its brim properly softened by exposure on a steam table or otherwise, has been introduced in the machine and (the principal brim-shaping pieces I J K having been before adjusted) the parts have been again contracted around the base of the crown, and it remains simply to adjust the roll before applying the sand-pan W, the operator rapidly moves his hands over the brim-surface to press down the roll upon the support M on each side and insure the engagement of the curl with the outer edge of the latter, and then turns the lever P³ back to its original position, which is determined by the engagement of the dog P⁴ with the proper notch in the wheel A⁴. This movement, operating through the right and left grooves $p$ and through the connected slide S and levers M' on the two pieces M, urges the latter forcibly outward within the curl of the hat to give the required shape. Next the lever L² is turned, giving through the shaft L an equal rotation to the two gear-wheels L', and through the racks N' drawing down the vertical slides N. This movement may be gaged by some mark or stop on the machine, if desired; but my experiments indicate that the sense of feeling is sufficient. The operator turns this lever until he feels an increased resistance, indicating that the slack is all taken up and the curl of the hat stretched downward, so that it is smoothly shaped. The parts being all in position, the sand-pan, filled with cold sand, is lowered and allowed to rest a few seconds upon the properly-strained brim, and the operation is complete. It remains simply to turn the lever L in the direction to raise the slides N; next to lift the dog P⁴ and turn the lever P³ in the direction to contract the breadth of the parts which shape the roll, and then to turn the lever C⁵ in the direction to relax the grip of the parts I R' on the base of the crown. The completely-shaped hat is now lifted out and a fresh one introduced, and the operation repeated.

The fixed wheel or segment A⁴ is provided with any required number of notches $a^4$. In adjusting the lever P³ during each operation the dog P⁴ is engaged in the proper notch $a^4$, so that it shall adjust the parts K M, which shape the mid-width and outer portions of the curl, in the proper position.

A⁵ is the stop, which may be adjusted by shifting into different holes provided in the fixed arc or segment A⁴ to prevent the lever P³ from being turned too far, so as to endanger the straining and injury of the delicate parts which are thereby operated.

I provide each of the removable heads with an oval filling-piece, O, preferably of cast-iron, made open-work, as shown, of a proper size to fit in the interior in the place of the hat, and having a flange, O', which rests upon the upper faces of the parts.

O² represents hook-shaped slides secured in approximately radial grooves on the upper face of the filling-piece O, and secured by pinching-screws O³, inserted through slots in the slides. This filling-piece and its hook-slides are removed when the head is in use, and when it is desired to remove the head from the machine this is placed in position and the hooks of the slides O² are engaged over the exterior of the brim molding parts and drawn inward until they embrace them. Then the several screws, O³, are set tight, holding the slides in place. Now, after slackening the screws T, the head firmly held together by the filling-piece O and its hook-slides O² may be lifted off and stored in any convenient position, while another head adapted for larger or smaller brims is applied upon the machine, and its tenons or roots $i$ are engaged by tightening the screws T. Then on slackening the screws O³, moving the hook slides O² outward, and lifting out the filling-piece O the machine is ready to work with the new head.

The sand-pan W is formed, as in my previous patent referred to, with a frame of metal and a bottom of canvas or other yielding material containing a sufficient quantity of sand, which, when allowed, acts with its gravity to press yieldingly on all parts of the brim and cause it to assume exactly the form of the metallic surfaces presented below, and also to act by its coldness in rapidly lowering the temperature of the previously steam-heated brim, so as to rapidly chill it and cause it to maintain the form. This sand-pan is raised and lowered by a chain, W', which runs over a pulley, E², supported in the swinging crane E' and turning on anti-friction rollers $e$. The other end of the chain W' carries a weight, W³, which is heavier than the sand pan in the proportion of about four (4) to three, (3.) This weight is guided on the post E, which is splined to receive a feather on the weight to hold it against turning horizontally, but is free to rise and sink.

G is a bell-crank lever pivoted to the fixed frame-work at $g$. The upper arm of this lever is connected by a link, G', to a pivot on the weight W³. The lower arm is connected by a link, G², to the treadle G³. When the treadle is released, the weight W³ sinks, and, acting through the chain W', raises the sand-pan W, which may then be swung to one side and the hat removed. When a fresh hat has been introduced and the parts adjusted, as shown, the said pan is brought into position over the hat by swinging the crane E', and a vigorous action of the foot of the operator on the treadle G³, acting through the bell-crank lever G and its connecting-links, forcibly raises the weight and brings the sand-pan down upon the hat-brim. In the last part of this motion the link G' and the upper arm of the lever G are brought nearly in line, so as to act togglewise with great force to raise and hold the weight W³ in its extreme elevated position. This togglewise action of these parts is of great service, allowing a moderate pressure of the foot on the treadle to raise the weight into its highest position and hold it there, allowing the whole gravity of the sand-pan W to rest upon the hat-brim.

Modifications may be made in the details without departing from the principle or sacrificing the advantages of the invention. I can employ a greater or a less number of the detachable heads. I prefer three. My slides N and their operating means may be used to attain only a portion of the result named. The slides N may be moved outward and not downward, or downward and not outward, according to style or shape desired.

I claim as my invention—

1. In a hat-brim shaper, the detachable and exchangeable head composed of pieces I J K M, capable of sliding one upon another and engaging with the adjustable pieces $D^4$ of a machine to allow of treating a wide range of sizes and widths of brim, as herein specified.

2. In a hat-brim shaper, the filling-piece O, hook-slides $O^2$, and holding means $O^3$, arranged to serve with a detachable head composed of parts overlapping and sliding one upon another, equipped for attaching to suitable mechanism for moving and holding them when not in use, as herein specified.

3. In a hat-brim shaper, the levers Z and operating-shaft U, with their right and left grooves $u$, in combination with the parts I J, adapted for varying the conditions simultaneously at the front and rear portions of the brim, substantially as herein specified.

4. In a hat-brim shaper, the side shaping pieces M, in combination with the levers $L^2$ and connecting means, as the pinions $L'$ and racks $N'$, arranged to smooth and vary the form of the roll of the brim, as herein specified.

5. In a hat-brim shaper, the parts I J K M, overlapping one upon another, with provisions for varying their position, as specified, and the wheel or segment $A^4$, having notches, as shown, in combination with each other and with the lever $P^3$, dog $P^4$, and with the stop $A^5$, arranged to prevent the motion from being carried too far, as herein specified.

6. In a hat-brim-shaping apparatus, the side pieces, M, each with two wings, $M^2$, pivoted thereto, with liberty to turn to a limited extent, in combination with means, as the rack $N'$ and pinion $L'$, for raising and lowering, and with means, as the shafts P and connecting-sleeve, and obliquely-grooved bosses $P'$ $P^2$, for moving them apart and together, all arranged for joint operation, substantially as herein specified.

7. In a hat-brim shaper, the shaping-pieces J at the front and back of the brim, each formed in two separate pieces knuckled together, with liberty to shift their centers, as shown, in combination with the cheeks $F^2$, engaging with the exteriors of the knuckles, as shown, and with the screw $F^3$, for moving their centers into and out of coincidence, arranged for joint operation, so as to change the contours of the outer edge of the brim by widening or narrowing the quarters, as herein specified.

8. In a hat-brim-shaping apparatus, the sand-pan W, in combination with the pulley $E^2$, chain $W'$, link $G'$, bell-crank lever G, and means for operating the latter by the foot, so as to raise and depress the sand-pan by a toggle action, as herein specified.

In testimony whereof I hereunto set my hand, at New York city, this 5th day of January, 1888, in the presence of two subscribing witnesses.

L. H. HOYT.

Witnesses:
 CHARLES R. SEARLE,
 M. F. BOYLE.